Patented July 1, 1930

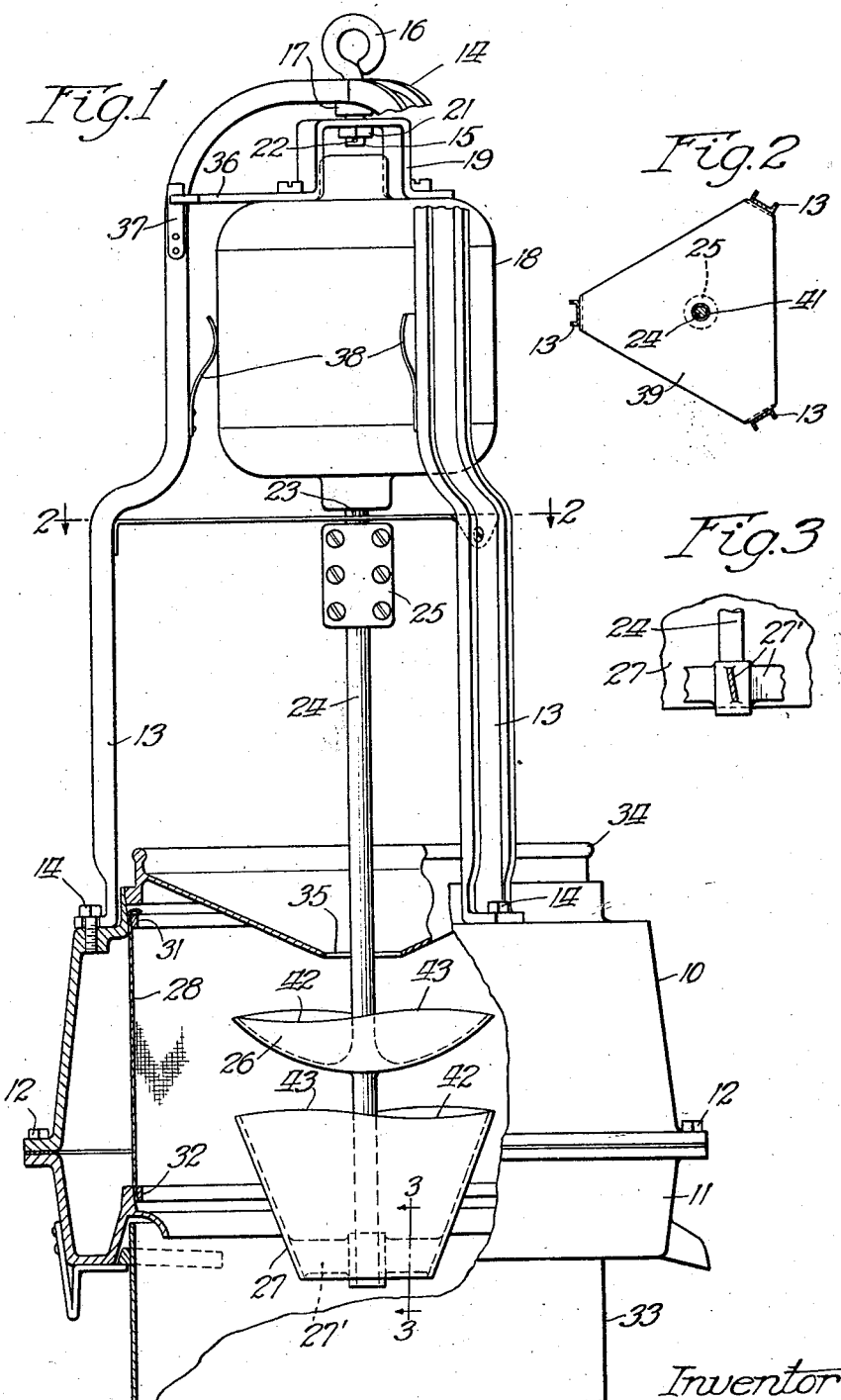

1,769,588

UNITED STATES PATENT OFFICE

FREDERICK H. LUENSE, OF CHICAGO, ILLINOIS, ASSIGNOR TO ROTOSPRAY MANUFAC-
TURING CO., OF CHICAGO, ILLINOIS, A CORPORATION OF ILLINOIS

ROTARY SPRAYING SEPARATOR

Application filed May 4, 1927. Serial No. 188,854.

My invention relates to separators and has to do particularly with improvements in the type of separator described in my co-pending application, Serial No. 72,993, filed December 3, 1925.

This separator comprises a stationary screen of substantially cylindrical form within which are supported a plurality of bowl shaped discs adapted to be revolved on a vertical axis at a comparatively high rate of speed. Material applied to the discs, is thrown or sprayed off the peripheries thereof with such force as to separate the solids from the liquid as the material strikes the screen.

The principal object of my present invention is to provide an improved fluid and solids separator.

Another object is to cause the material sprayed by the discs to be distributed evenly against the screen.

Another object is to provide improved means for rotatably driving the discs.

Another object is to provide an improved motor mounting and disc support for such separators.

Other objects and advantages will appear from a consideration of the following detailed description taken with the accompanying drawings wherein—

Fig. 1 is a front elevational view, partially in section, showing one embodiment of my invention;

Fig. 2 is a fragmentary sectional view of reduced size taken on the line 2—2 of Fig. 1, and, Fig. 3 is a fragmentary section on the line 3—3 of Fig. 1.

The separator comprises a framework formed of upper and lower casings 10 and 11 respectively, secured together by bolts 12—12 and a plurality of uprights 13—13 which are here shown as channel irons secured to the casing 10 by screws 14—14. The uprights are brought together at their upper extremities to form an arbor support 14, the uprights being secured together at this point in any suitable manner.

A bolt 15 having a looped end 16 extends through an aperture of the arbor support and is loosely held in place by means of a nut 17. An electrical motor 18 carries at its upper end, a yoke 19 through which the bolt 15 is adapted to extend and be held in place by a nut 21. Any usual safety precaution such as the use of cotter pin 22 is resorted to to prevent accidental displacement of nut 21.

The usual motor shaft 23 of the motor, extends downwardly and is equipped with a shaft extension 24 secured thereto by a shaft coupling 25. The lower end of the shaft extension carries a bowl-like disc 26 secured to rotate therewith and an inverted truncated cone 27 at the lower extremity thereof, secured thereto by supports 27'. These supports are in the form of blades which are set at an angle as shown in Fig. 3, and thereby serve to elevate material with which they may come in contact.

A screen 28, is secured within the casing portion of the framework by means of rings 31 and 32 and a pan 33 adapted to be secured to the lower portion of casing 11, closes the bottom opening thereof. A funnel 34 having a central aperture 35 for the passage of the motor shaft extension, is provided on the upper part of the casing 10.

Most of the details of my improved separator heretofore described, are shown in my co-pending application; but the manner in which a separator of this type functions, should possibly be made clear before describing the improvements which are the subject matter of the present case.

The material to be separated is introduced continuously and in any suitable manner to the disc (or discs) 26. The discs, revolving at a high rate of speed with the motor, causes the material to fly off at a tangent to the periphery thereof and strike against the screen. A portion of the liquid in the material, will pass through the screen by the force of the impact, and flow to the bottom of the annular trough formed by the lower casing 11 whence it flows through a properly provided spout. The balance of the material flows down the inside of the screen into the pan 33. When the pan is filled sufficiently to cause the material therein to engage the bottom edge of the truncated cone 27, such material will be drawn up the inside of the cone by the blade supports 27' and finally thrown off the upper edge thereof to strike against the screen and thus result in a further separating action.

It is obvious that the discs must be driven at a high rate of speed and accordingly an exact balance of rotating parts must be obtained. By suspending the motor with its shaft bearing the discs, extending vertically downward the motor may be run at a very high rate of speed without danger, because when it is freely suspended in this manner it centers itself, and finds its own axis of rotation. Otherwise with the motor fixed, if the shaft is slightly out of balance it will vibrate badly, and even fly off the center by bending when the condition becomes aggravated. The swivel connection described results in a free suspension of the moving parts, but of course any other type of connection having this affect, can be used.

To prevent the motor from turning about its swivel under load, I provide an extension 36 on yoke 19 adapted to bear against a leaf spring 37 secured on one of the uprights 13. This not only prevents turning of the motor, but the spring permits a sufficient lost motion for the starting to be gradual. In other words, it compensates for the inertia that has to be overcome when the motor is first started and the load thereon is fairly heavy.

Each one of the uprights 13, has on its inside face, a spring 38 adapted by engaging the outside casing of the motor to support it at all times in substantially proper position. The support is resilient and the motor is still free to compensate for any possible imbalance of the discs. Immediately below the motor, is a baffle plate 39 with a central aperture 41 through which the motor shaft is adapted to extend. The baffle plate prevents such material as is thrown upwardly during the operation of the separator, from entering the open end of the motor 18 and injuring same. The baffle plate is also made thick enough to serve as a reinforcing brace for the uprights.

The peripheries of both the disc and the cone have long shallow incisions such as shown in the drawings, resulting in an undulating edge consisting of lowered and raised portions 42 and 43 respectively. This arrangement of the periphery or edge of these spraying elements, causes them to distribute the sprayed material over substantially the entire inside surface of the screen instead of in a single line as would happen if a straight edge spraying member were employed. The lower edge 42, distributes material in a lower position on the screen, than the raised edge 42.

Although for purpose of explanation, I have referred to specific details of my invention, it is obvious that I do not limit myself thereto, but what I claim as new and desire to secure by United States Letters Patent is as follows:

1. In a fluid and solids separator a stationary screen, a rotatable disc adapted to spray material against the screen, means for receiving the material passing through the screen, a pan below the screen for receiving the material not passing through the screen, an inverted rotatable cone extending into the pan having angular blades for withdrawing material from the pan to be sprayed against the screen by the outer periphery of said cone.

2. The separator defined in claim 1, wherein said blades serve as supports to secure said cone to its shaft.

3. The separator defined in claim 1, wherein the top of said cone is of uneven conformation whereby the material sprayed thereby is distributed evenly on the screen over a comparatively large area.

4. In a fluid and solids separator a stationary screen, a rotatable disc adapted to spray material against the screen, means for receiving the material passing through the screen, a pan below the screen for receiving the material not passing through the screen, an inverted rotatable cone extending into the pan adapted to draw material from said pan and re-spray it against the screen, said cone having its top outer edge of uneven conformation whereby the material sprayed thereby is distributed evenly on the screen over a comparatively large area.

In witness whereof I hereunto subscribe my name this 9th day of April, 1927.

FREDERICK H. LUENSE.